United States Patent
Mason et al.

(10) Patent No.: US 12,099,950 B2
(45) Date of Patent: Sep. 24, 2024

(54) ORDER CANCELLING UI COMPONENT MANAGEMENT

(71) Applicant: SHOPIFY INC., Ottawa (CA)

(72) Inventors: Michael Mason, Windsor Junction (CA); Eduardo Jose Mujica Leon, Toronto (CA); Maria Pia Vergara, Los Altos, CA (US); Veidarshon Rajasegaran, Ottawa (CA)

(73) Assignee: SHOPIFY INC., Ottawa (CA)

( * ) Notice: Subject to any disclaimer, the term of this patent is extended or adjusted under 35 U.S.C. 154(b) by 182 days.

(21) Appl. No.: 17/535,636

(22) Filed: Nov. 25, 2021

(65) Prior Publication Data

US 2023/0162115 A1    May 25, 2023

(51) Int. Cl.
G06Q 10/00       (2023.01)
G06F 3/00        (2006.01)
G06Q 10/0631     (2023.01)
G06F 3/0484      (2022.01)

(52) U.S. Cl.
CPC ........... *G06Q 10/06316* (2013.01); *G06Q 10/063114* (2013.01); *G06F 3/0484* (2013.01)

(58) Field of Classification Search
CPC ............................. G06Q 10/00; G06Q 50/00
USPC ............................................ 705/7.15
See application file for complete search history.

(56) References Cited

U.S. PATENT DOCUMENTS

| | | | | |
|---|---|---|---|---|
| 10,839,332 | B1 * | 11/2020 | McBride | G06K 1/121 |
| 2014/0100715 | A1 * | 4/2014 | Mountz | G06Q 10/087 |
| | | | | 701/2 |
| 2016/0063435 | A1 * | 3/2016 | Shah | G06Q 30/0633 |
| | | | | 705/44 |
| 2017/0206622 | A1 * | 7/2017 | Pavlov | G06Q 10/063112 |
| 2023/0093977 | A1 * | 3/2023 | Romaniuk | G06Q 30/0633 |
| | | | | 705/334 |

* cited by examiner

*Primary Examiner* — Mustafa Iqbal
(74) *Attorney, Agent, or Firm* — Hanley, Flight & Zimmerman, LLC

(57) ABSTRACT

Some embodiments of the present disclosure provide, as part of a user interface related to the fulfillment of an order, a user interface component that, when activated, causes transmission of a request to cancel the order. According to a specific configuration, receipt of a notification related to commencement of a "threshold" step in a process of fulfilling the order causes the user interface component to be disabled. Notably, by appropriately selecting the threshold step in the process of fulfilling the order, costs related to cancelling orders may be optimized while still providing enhanced order-cancelling flexibility to customers.

20 Claims, 6 Drawing Sheets

| E-Commerce Platform | Q Search | JG John's Apparel / Jonny B. Good |
|---|---|---|

⌂ Home
↪ Orders
◇ Products
○○ Customers
⊟ Reports
⊛ Discounts
⊞ Apps

SALES CHANNELS ⊕
🏬 Online Store
▯ Mobile App
View all channels

⚙ Settings

Good afternoon, Jonny B..
Here's what's happening with your store today.

Today's total sales    Today's visits
$98.00                 1

● Update your Platform Payments tax details
We require additional information to verify your identity.
[Update tax details]

● Advanced Cash on Delivery has been deactivated for your store
[See why]

All channels ⌄    Today ⌄

TOTAL SALES
$98.00

$125
$75
$25
        12am    8pm    4pm    11pm
                              Jun 1
                              2 orders TOTAL SALES BY CHANNEL    View dashboard    Jun 1

Online Store
$0.00                                      0 orders

Mobile app
$0.00                                      0 orders

Shopify POS (126 York St.)
$0.00                                      0 orders

ORDER CANCELLING UI COMPONENT MANAGEMENT

TECHNICAL FIELD

The present disclosure relates, generally, to user interfaces and, in particular embodiments, to components of user interfaces related to cancelling orders in relation to systems for order fulfillment.

BACKGROUND

An online store or online marketplace may be expected to be implemented across multiple systems. Some of the systems may be expected to be associated with some form of user interface (UI).

For example, an example online store may maintain a first system and a second system. The first system may take the form of a system configured to manage fulfillment of orders received based upon customer interaction with a UI associated with the second system. In many instances, the two systems are integrated with one another. The first system may handle interaction between the online store and a warehouse service provider. A warehouse system associated with the warehouse service provider may receive fulfillment requests from the first system. As various steps in a process of fulfilling the order are carried out by the warehouse service provider, the warehouse system may provide notifications to the first system.

SUMMARY

As part of a user interface related to the fulfillment of an order, a user interface component may be provided that, when activated, causes transmission of a request to cancel the order. According to a specific configuration, receipt of a notification related to commencement of a threshold step in a process of fulfilling the order causes the user interface component to be disabled. Notably, by appropriately selecting the threshold step in the process of fulfilling the order, costs related to cancelling orders may be optimized while still providing enhanced order-cancelling flexibility to customers.

According to an aspect of the present disclosure, there is provided a computer-implemented method. The method includes transmitting, by a first computer system to a remote fulfillment computer system, a request related to fulfillment of an order, providing, by the first computer system to a remote client device, instructions for a user interface related to the fulfillment of the order, wherein, as part of the user interface, there is to be provided an enabled user interface component that, when activated, triggers cancellation of the order, receiving, by the first computer system responsive to the request related to the fulfillment of the order, a notification and, responsive to the receiving the notification, providing, to the remote client device, an indication corresponding to the notification, wherein the user interface component is to be disabled in subsequent renderings of the user interface at the remote client device.

Conveniently, in this way, there may be provided a user interface component as may both allow the cancelability of an order (i.e., whether the order can be canceled) to be visually conveyed by way of its enablement/disablement and to allow such cancelation to be requested/triggered.

According to some aspects, the notification may include an indication that a particular step, in a process of fulfilling the order, has commenced.

According to some aspects, the particular step may be a step selected from amongst a plurality of possible steps in the process of fulfilling the order based on a size of an item in the order.

According to some aspects, the particular step may be a step selected from amongst a plurality of possible steps in the process of fulfilling the order based on a volume of sales for a customer associated with the order.

According to some aspects, the particular step may be a step selected from amongst a plurality of possible steps in the process of fulfilling the order based on a volume of sales of an item in the order.

According to some aspects, the particular step may be a picking step.

According to some aspects, the notification may be a notification webhook post.

According to some aspects, the method may further include receiving an indication of an event related to activation of the enabled user interface components and responsive to the receiving the indication of the event related to activation of the enabled user interface component, causing transmission, to a destination, of a request to cancel the order.

According to some aspects, the destination may be the remote fulfillment computer system.

According to another aspect of the present disclosure, there is provided a system. The system includes a memory storing instructions and at least one processor. The at least one processor may be caused, by execution of the instructions, to transmit, to a remote fulfillment computer system, a request related to fulfillment of an order, provide, to a remote client device, instructions for a user interface related to the fulfillment of the order, wherein, as part of the user interface, there is to be provided an enabled user interface component that, when activated, triggers cancellation of the order, receive, responsive to the request related to the fulfillment of the order, a notification and provide, to the remote client device, an indication corresponding to the notification, wherein the user interface component is to be disabled in subsequent renderings of the user interface at the remote client device.

According to some aspects, the notification may be an indication that a particular step, in a process of fulfilling the order, has commenced.

According to some aspects, the particular step may be a step selected from amongst a plurality of possible steps in the process of fulfilling the order based on a size of an item in the order.

According to some aspects, the particular step may be a step selected from amongst a plurality of possible steps in the process of fulfilling the order based on a volume of sales for a customer associated with the order.

According to some aspects, the particular step may be a step selected from amongst a plurality of possible steps in the process of fulfilling the order based on a volume of sales of an item in the order According to some aspects, the particular step may be a picking step.

According to some aspects, the notification may be a notification webhook post.

According to some aspects, the at least one processor may further be caused to receive an indication of an event related to activation of the enabled user interface components and to cause transmission, to a destination, of a request to cancel the order.

According to some aspects, the destination may be the remote fulfillment computer system.

According to a further aspect of the present disclosure, there is provided a computer readable medium having stored thereon computer-executable instructions that, when executed by a computer system, cause the computer system to perform operations. The operations may include transmitting, to a remote fulfillment computer system, a request related to fulfillment of an order, providing, to a remote client device, instructions for a user interface related to the fulfillment of the order, wherein, as part of the user interface, there is to be provided an enabled user interface component that, when activated, triggers cancellation of the order, receiving, responsive to the request related to the fulfillment of the order, a notification and, responsive to the receiving the notification, providing, to the remote client device, an indication corresponding to the notification, wherein the user interface component is to be disabled in subsequent renderings of the user interface at the remote client device.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 2 illustrates a home page of an administrator of the e-commerce platform of FIG. 1, according aspects of the present application;

FIG. 6 illustrates an example UI page, in accordance with aspects of the present application.

DETAILED DESCRIPTION OF ILLUSTRATIVE EMBODIMENTS

For illustrative purposes, specific example embodiments will now be explained in greater detail in conjunction with the figures.

Although integration with a commerce platform is not required, in some embodiments, the methods disclosed herein may be performed on or in association with a commerce platform such as an e-commerce platform. Therefore, an example of a commerce platform will be described.

Figure 1:
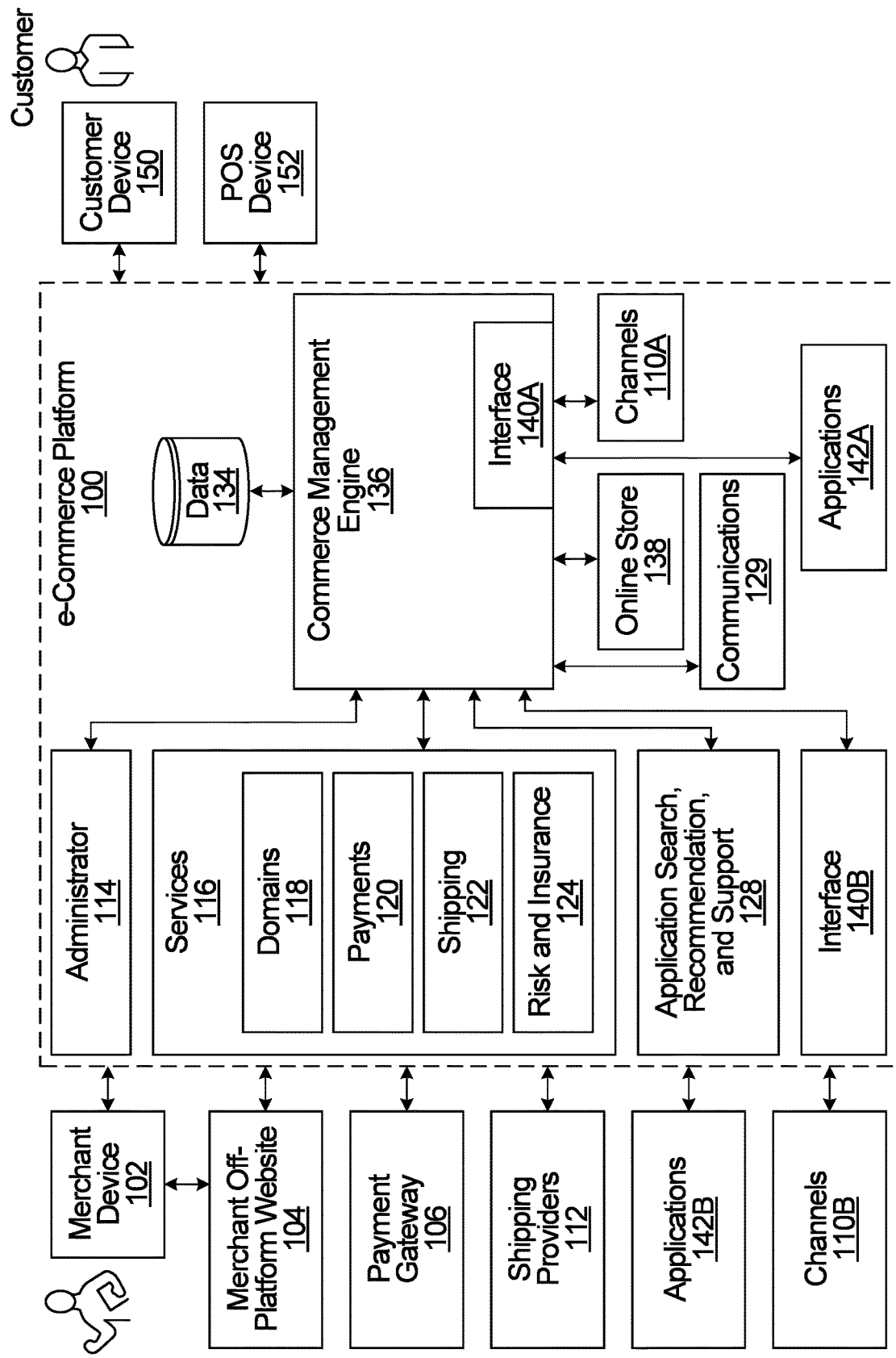
FIG. 1 illustrates, in a block diagram, an e-commerce platform, according aspects of the present application.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers,' and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, the online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, the applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and, in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications; merchant-facing applications; integration applications; and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152, an electronic marketplace, through an electronic buy button integrated into a website or a social media channel). In some cases, channels 110A-B may be modeled as applications 142A-B. A merchandising component in the commerce management engine 136 may be configured for creating and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over selling (e.g., merchants may control this behavior using an inventory policy or configuration for each variant). Inventory reservation may have a short time span (minutes) and may need to be fast and scalable to support flash sales or "drops," which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as: a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale related events that happened to an item).

In conjunction with a steep increase in the adoption of online commerce has come a steep increase in the occurrence of "buyer's remorse." Online stores are acutely aware that, as buying items online becomes easier, a customer may regret purchasing a given item long before the given item reaches the customer. For this reason, online stores often implement a "buyer's remorse" time period. According to an article titled, "How to Back Out of an Online Purchase" published by wikihow.com, for some companies, the buyer's remorse time period is in a range from 30 minutes to an hour measured from the moment of the placing of the order. For other companies, the buyer's remorse time period is 24 hours. For still further companies, the buyer's remorse time period is not well defined and may extend until the moment that an order has shipped. During the buyer's remorse time period, it is relatively straightforward for an online purchase to be cancelled by the customer. For example, the customer-facing system may be configured so that an order is not passed to the fulfillment system until the expiry of the buyer's remorse time period.

When determining a duration for a buyer's remorse time period, an online store may act to balance the customer's wish to receive the given item as soon as possible with a goal of satisfying the customer's wish to cancel an order with as little inconvenience and cost (to the online store) as possible. Different fulfilment systems may be associated with correspondingly different degrees of inconvenience and cost associated with cancelling an order once the order has been received by the fulfillment system and once many steps in a process of fulfilling the order have already been completed by the warehouse service provider.

In overview, aspects of the present invention relate to managing a UI so that the UI includes a UI component that allows for cancellation of an order, even though many steps in the process of fulfilling the order may have already been completed by the warehouse service provider.

According to some customizable parameters, managing the UI may involve causing the UI component to be actively removed, or otherwise disabled, from an order-specific page of the UI. Notably, in some aspects of the present application, the UI may be implemented at a merchant-facing device. In other aspects of the present application, the UI may be implemented at a merchant-facing device.

Management of the UI to cause active removal, or other manner of disabling, the UI component from the order-specific page may be carried out responsive to receipt of notification of commencement of a particular "threshold" step in a process of fulfilling the order. The threshold step may be selected on the basis of a logistic infeasibility of cancelling the order after the threshold step has commenced.

The threshold step may, alternatively, be configured to optimize costs, to the online store, associated with cancelling the order. The threshold step may, alternatively, be configured to maximize the cancellation window for the buyer within an acceptable cost to the merchant. The threshold step may be considered to be a configuration parameter that may be automatically selected by the e-commerce platform 100 on the basis of information available to the e-commerce platform 100. Indeed, a duration for a buyer's remorse time period is another configuration parameter that may be automatically selected by the e-commerce platform 100.

Figure 3:
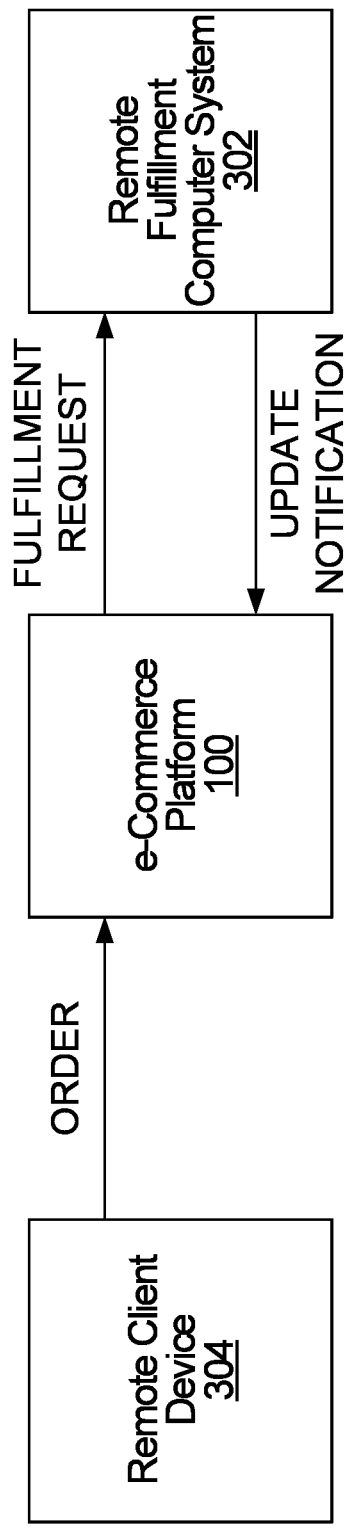
FIG. 3 illustrates elements of an online store or online marketplace implemented across multiple systems, including the e-commerce platform, familiar from FIG. 1, a remote fulfillment computer system and a remote client device, in accordance with aspects of the present application.

FIG. 3 illustrates elements of an online store or online marketplace implemented across multiple systems, including the e-commerce platform 100, familiar from FIG. 1, a remote fulfillment computer system 302 and a remote client device 304. The elements are illustrated, in FIG. 3, managing an order. The remote fulfillment computer system 302 may be understood to be a computer system configured to execute software to manage fulfillment of orders.

A user interface, as part of a system related to the fulfillment of an order, may present, to an operator, user interface components that allow the operator to place an order. Accordingly, the remote client device 304 may implement such a user interface. The operator may interact with the UI on the remote client device 304 in such a manner as to cause an order to be placed at the e-commerce platform 100. The e-commerce platform 100 may pass a fulfillment request, related to the order, to the remote fulfillment computer system 302. Subsequently, the remote fulfillment computer system 302 may pass the fulfillment request to a warehouse system (not shown). Upon receipt from the warehouse system of update event notifications regarding the order, the remote fulfillment computer system 302 may pass such update event notifications to the e-commerce platform 100. An update event notification may take the form of a notification webhook post. Alternatively, an update event notification may take the form of a push notification, that is, an unsolicited notification providing an update. Further alternatively, an update event notification may take the form of a notification that pulled during regular polling, that is, a solicited notification providing an update.

In overview, according to aspects of the present invention, the user interface at the remote client device 304 may include a specific user interface component. The specific user interface component, when activated, may cause the remote client device 304 to transmit a request to cancel the order.

Figure 4:
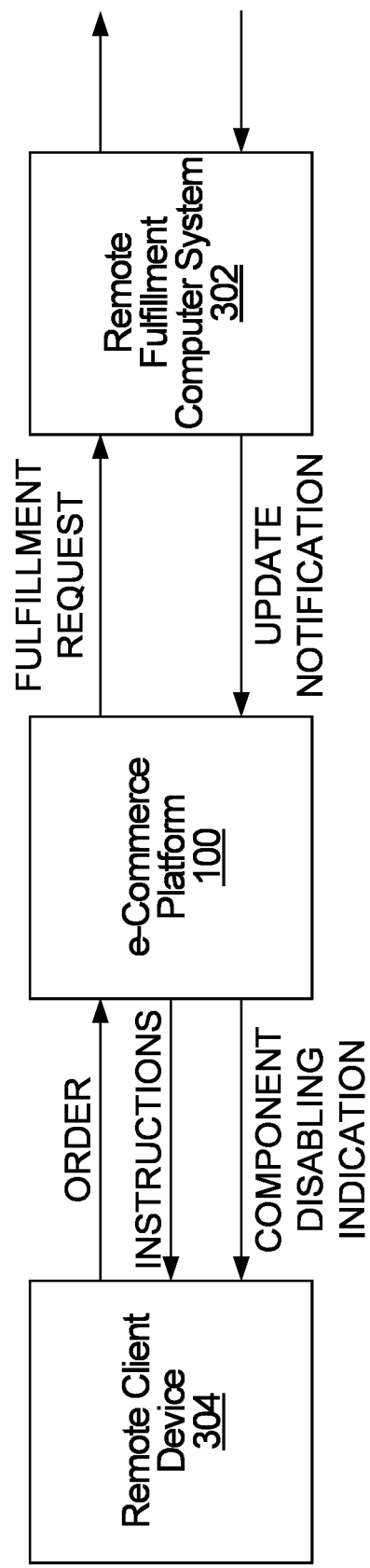
FIG. 4 illustrates the elements of FIG. 3 in association with communication related to management of an order in a manner consistent with aspects of the present application.

The elements of FIG. 3 are illustrated in FIG. 4 in association with communication related to management of an order in a manner consistent with aspects of the present application. The various communications between the elements of FIG. 4 may traverse a variety of networks, both wired and wireless. The variety of networks may, for example, include corporate intranets and the Internet.

In some aspects of the present application, the remote client device 304 is in the form of a device under control of a customer of a merchant. In this aspect, the UI presented by the remote client device 304 is customer-facing. In some aspects of the present application, the remote client device 304 is under control of a merchant. In this aspect, the UI presented by the remote client device 304 is merchant-facing.

Figure 5:
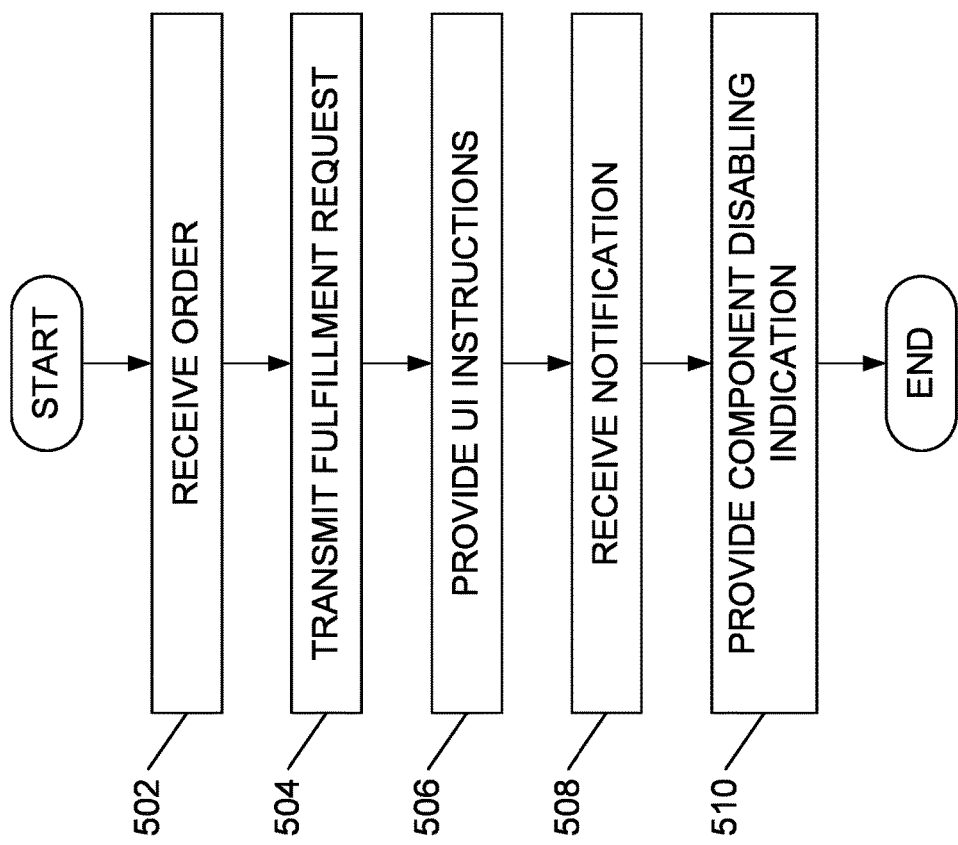
FIG. 5 illustrates example steps in a method of managing, at the e-commerce platform of FIG. 1, a user interface presented at the remote client device of FIG. 4, in accordance with aspects of the present application.

FIG. 5 illustrates example steps in a method of managing, at the e-commerce platform 100, a user interface presented at the remote client device 304.

Responsive to receiving (step 502), from the remote client device 304, an order, the e-commerce platform 100 may transmit (step 504), to the remote fulfillment computer system 302, a request related to fulfillment of the order.

The e-commerce platform 100 may provide (step 506), to the remote client device 304, instructions for a user interface related to managing the order. The instructions may indicate that there is to be provided, as part of the user interface, a specific user interface component. In operation, the specific user interface component, when activated, may trigger the remote client device 304 to transmit, to the e-commerce platform 100, a cancellation request specifying the order received in step 502. The specific user interface component may, for example, take the form of a "Request cancellation" button. Activating a button, e.g., to trigger transmission of a cancellation request, may take the form of a mouse click with a mouse cursor over the button. Activating a button may also take the form of a finger-tap on a touch-sensitive screen in an area of the screen occupied by the button.

Figure 6:
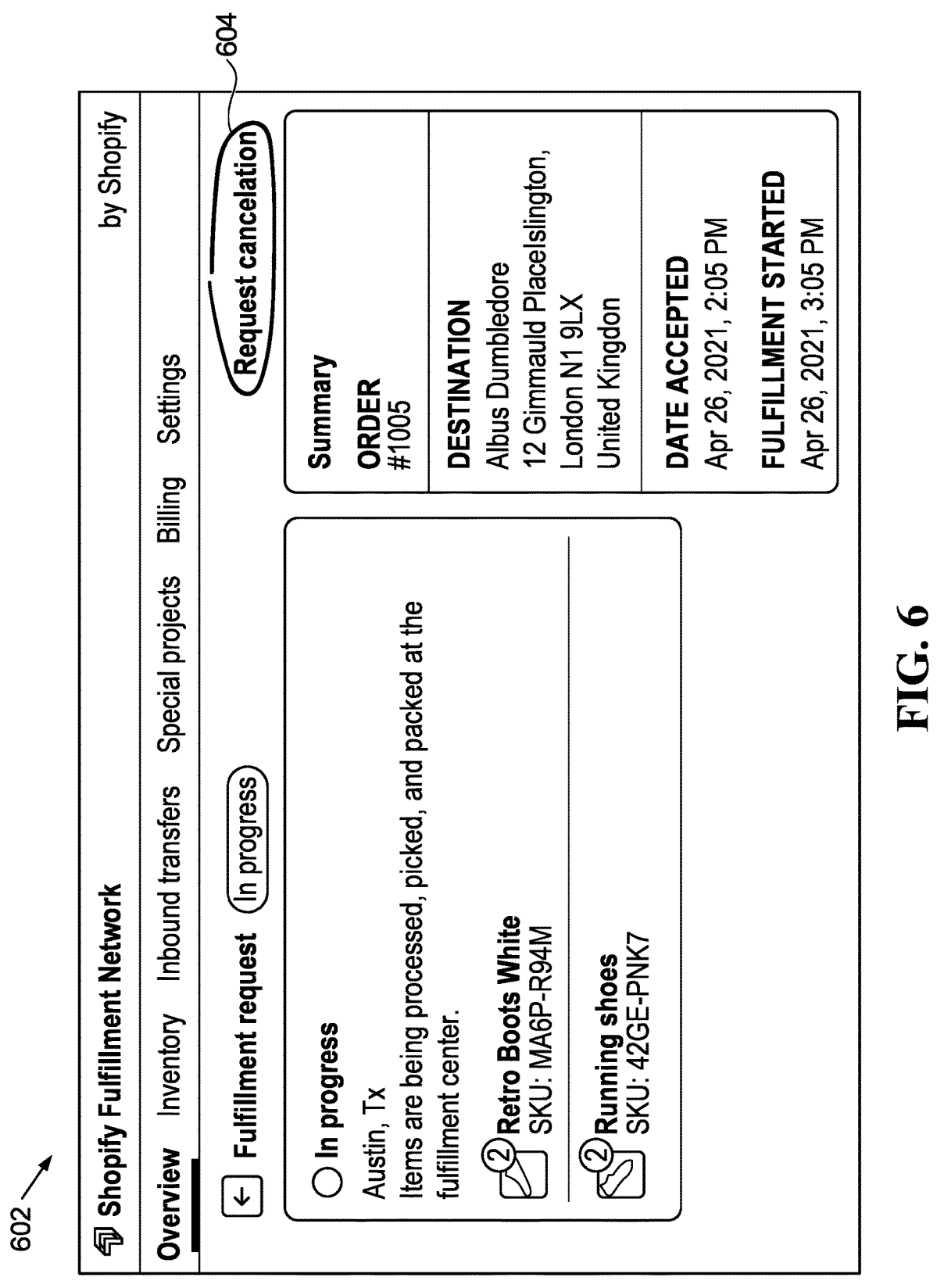

FIG. 6 illustrates an example UI page 602, in accordance with aspects of the present application. The example UI page 602 includes a "Request cancellation" button 604.

The instructions, provided (step 506) to the remote client device 304, may be implemented in Hyper Text Markup Language (HTML) and may make use of Cascading Style Sheets (CSS) and/or JavaScript™.

Notably, the process of fulfilling an order, under control of the remote fulfillment computer system 302, has many steps. Accordingly, the order may be associated with a variety of states. Such states may, for a few examples, include: order fulfillment request received; picking order; packaging order; and order shipped. Notably, in a scenario wherein a product that is the subject of a given order is stored in a warehouse, the "picking order" state relates to a time period wherein the product is being retrieved from its designated location in the warehouse. Each time an order changes state, the warehouse system may transmit, to the remote fulfillment computer system 302, update event notifications. Upon receiving an order fulfillment request, the warehouse system may transmit an update event notification indicative of the order fulfillment request received state. Upon commencing an effort to retrieve the product from its designated location in the warehouse, the warehouse system may transmit an update event notification indicative of the picking order state. Upon commencing an effort to package the product, the warehouse system may transmit an update event notification indicative of the packaging order state. Upon completion of an effort to ship the product, the warehouse system may transmit an update event notification indicative of the order shipped state. Correspondingly, the remote fulfillment computer system 302 may transmit, to the e-commerce platform 100, the update event notifications received from the warehouse system.

It follows that the e-commerce platform 100 may receive (step 508), from the remote fulfillment computer system 302, update event notifications. Among the update event notifications, there may be a particular update event notification related to the order received in step 502. Each update event notification, received in step 508, may take the form of a notification webhook post.

Responsive to the receiving the particular update event notification, the e-commerce platform 100 may provide (step 510), to the remote client device 304, a component disabling indication. The component disabling indication may indicate, to the remote client device 304, that the user interface is to be refreshed. More particularly, the component disabling indication may indicate, to the remote client device 304, that the "Request cancellation" button (the specific user interface component) is to be disabled in the refreshed user interface.

The component disabling indication may include an instruction to refresh the UI to a new page. Alternatively, the component disabling indication may include a response to a poll by the remote client device 304.

The term "disabled" may, for one example, relate to a greyed-out version of the "Request cancellation" button remaining as part of the UI presented at the remote client device 304, where clicking the "Request cancellation" button has no effect. The term "disabled" may, for another example, relate to the "Request cancellation" button disappearing from the UI presented at the remote client device 304. It should be clear that disabled is the opposite of enabled. In contrast, disabled should not be considered to be an opposite of activated.

Many considerations may enter into selecting the step at which to arrange disabling of an ability to cancel an order. If, for example, the picking step is selected, then the update event notification that triggers the disabling of the "Request cancellation" button may be an update event notification that indicates that the processing of the received fulfillment request has entered a picking state.

As discussed hereinbefore, there are steps in the process of fulfilling an order that occur subsequent to the commencement of the picking step. The act of cancelling an order subsequent to the commencement of the picking step may be more costly to the online store. The costs may be incurred in the form of fees charged by the warehouse service provider. The warehouse service provider may charge the fees, for a request to cancel an order, on the basis of a degree of progress, in the process of fulfilling the order, that has been achieved when the request to cancel is received.

The step that is selected for disabling the ability, at the UI presented by the remote client device 304, to cancel an order (hereinafter the "cancel-disabling step") may be different for different customers of the online store and/or for different items sold by the online store.

For example, an operator of the e-commerce platform 100 may select a first cancel-disabling step for a low-volume customer and a second cancel-disabling step for a high-volume customer, where the second cancel-disabling step is related to a greater degree of progress in the process of fulfilling a given order than the first cancel-disabling step. Notably, there may be greater fees charged by the warehouse service provider for cancelling an order in progress after the first cancel-disabling step but before the second cancel-disabling step. It may be established that the costs associated with the second cancel-disabling step for the high-volume customer are worth absorbing, given the scale of business received from the high-volume customer.

Similarly, a first cancel-disabling step may be selected for a low-volume item and a second cancel-disabling step may be selected for a high-volume item, where the second cancel-disabling step is related to a greater degree of progress in the process of fulfilling a given order than the first cancel-disabling step. Arrangements may be made with the warehouse service provider such that a high-volume item that has been picked, but not yet packaged or shipped may be temporarily set aside, or immediately assigned as the pick for a different order (of the same quantity and type of SKU(s)). The set-aside high-volume item may then skip the picking step the next time a fulfillment request is received for the high-volume item.

Furthermore, a first cancel-disabling step may be selected for a large item and a second cancel-disabling step may be selected for a small item, where the second cancel-disabling step is related to a greater degree of progress in the process of fulfilling a given order than the first cancel-disabling step. There may exist information, provided by the warehouse service provider, that indicates that there is a greater fee associated with restocking an 85" television and a lesser fee associated with restocking a bike computer.

To this point, the present invention has been discussed in a context of an order relating to a single item. It should be clear that often, an order may relate to a plurality of items in a so-called "bulk order." During the fulfillment of a bulk order, the warehouse service provider may progress through a process of fulfillment more rapidly for some items in the order and more slowly for other items in the order. The selection, by the operator of the e-commerce platform 100 or by the e-commerce platform 100 itself, of a cancel-disabling ("threshold") step for the bulk order may relate to degree of progress, in the process of fulfillment of the item that has achieved the greatest degree of progress, in the process of fulfillment. Alternatively, the selection, by the operator of the e-commerce platform 100 or by the e-commerce platform 100 itself, of a cancel-disabling ("threshold") step for the bulk order may relate to degree of progress, in the process of fulfillment of the item that has achieved the least degree of progress, in the process of fulfillment.

In each of the various scenarios discussed herein, it is assumed that a mechanism is in place for the e-commerce platform 100 to receive update event notifications regarding commencement of steps in a process of fulfilling an order. In those cases wherein such a mechanism is not in place, the UI presented at the remote client device 304 may not provide a UI component that allows cancellation of an order. Alternatively, the order-cancellation UI component may be present but immediately disabled.

It may be that, sometime before the e-commerce platform 100 receives (step 508) an update event notification that would cause the e-commerce platform 100 to provide (step 510), to the remote client device 304, a component disabling indication, the e-commerce platform 100 may receive, from the remote client device 304, an indication of an event related to activation of the enabled "Request cancellation" button. Responsive to the receiving the indication of the event related to activation of the enabled "Request cancellation" button, the e-commerce platform 100 may transmit, to the remote fulfillment computer system 302, a request to cancel the order.

The e-commerce platform 100 may receive a request to cancel an order that is in progress with a warehouse service provider, and an operator of the e-commerce platform 100 may be required to contact a warehouse service provider support team. Responsive to being contacted regarding the order cancellation request, the warehouse service provider support team creates a ticket for the order cancellation request.

In aspects of the present application there is provided a system that includes a memory storing instructions and at least one processor caused, by execution of the instructions, to transmit, to a remote fulfillment computer system, a request related to fulfillment of an order, provide, to a remote client device, instructions for a user interface related to the fulfillment of the order, wherein, as part of the user interface, there is to be provided an enabled user interface component that, when activated, triggers cancellation of the order, receive, responsive to the request related to the fulfillment of the order, a notification and provide, to the remote client device, an indication corresponding to the notification, wherein the user interface component is to be disabled in the refreshed user interface responsive to the indication.

In some embodiments, a computer-readable medium is provided having stored thereon computer-executable instructions that, when executed by a computer, cause the computer to perform method steps described hereinbefore.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
transmitting, by a first computer system to a remote fulfillment computer system, a request related to fulfillment of an order;
transmitting, by the first computer system to a remote client device, instructions for a user interface to be rendered at the remote client device, the user interface related to the fulfillment of the order, the user interface including an enabled user interface component that, when activated, triggers cancellation of the order;
receiving, at the first computer system, a notification from the remote fulfillment computer system, the notification responsive to the request related to the fulfillment of the order;
responsive to receiving the notification, generating, by the first computer system, instructions to cause the user interface component to be disabled in subsequent renderings of the user interface at the remote client device; and
transmitting, by the first computer system to the remote client device, the instructions to cause the user interface component to be disabled in the subsequent renderings of the user interface at the remote client device.

2. The method of claim 1, wherein the notification includes an indication that a particular step in a process of fulfilling the order has commenced.

3. The method of claim 2, wherein the particular step includes a step selected from amongst a plurality of possible steps in the process of fulfilling the order based on a size of an item in the order.

4. The method of claim 2, wherein the particular step includes a step selected from amongst a plurality of possible steps in the process of fulfilling the order based on a volume of sales for a customer associated with the order.

5. The method of claim 2, wherein the particular step includes a step selected from amongst a plurality of possible steps in the process of fulfilling the order based on a volume of sales of an item in the order.

6. The method of claim 2, wherein the particular step includes a picking step.

7. The method of claim 1, wherein the notification includes a notification webhook post.

8. The method of claim 1, further including:
receiving, at the first computer system, an indication of an event related to activation of the enabled user interface component; and
responsive to receiving the indication of the event related to activation of the enabled user interface component, transmitting, by the first computer system to a destination, a request to cancel the order.

9. The method of claim 8, wherein the destination is the remote fulfillment computer system.

10. A system comprising:
memory;
machine-readable instructions; and
at least one processor to execute the machine-readable instructions to:
transmit, to a remote fulfillment computer system, a request related to fulfillment of an order;
transmit, to a remote client device, instructions for a user interface to be rendered at the remote client device, the user interface related to the fulfillment of the order, the user interface including an enabled user interface component that, when activated, triggers cancellation of the order;
receive a notification from the remote fulfillment computer system, the notification responsive to the request related to the fulfillment of the order;
responsive to receiving the notification, generate instructions to cause the user interface component to be disabled in subsequent renderings of the user interface at the remote client device; and
transmit, to the remote client device, the instructions to cause the user interface component to be disabled in the subsequent renderings of the user interface at the remote client device.

11. The system of claim 10, wherein the notification includes an indication that a particular step in a process of fulfilling the order has commenced.

12. The system of claim 11, wherein the particular step includes a step selected from amongst a plurality of possible steps in the process of fulfilling the order based on a size of an item in the order.

13. The system of claim 11, wherein the particular step includes a step selected from amongst a plurality of possible steps in the process of fulfilling the order based on a volume of sales for a customer associated with the order.

14. The system of claim 11, wherein the particular step includes a step selected from amongst a plurality of possible steps in the process of fulfilling the order based on a volume of sales of an item in the order.

15. The system of claim 11, wherein the particular step includes a picking step.

16. The system of claim 10, wherein the notification includes a notification webhook post.

17. The system of claim 10, wherein one or more of the at least one processor is to:
receive an indication of an event related to activation of the enabled user interface component; and
transmit, to a destination, a request to cancel the order.

18. The system of claim 17, wherein the destination is the remote fulfillment computer system.

19. A non-transitory computer readable medium comprising machine-readable instructions to cause at least one processor to at least:
transmit, to a remote fulfillment computer system, a request related to fulfillment of an order;
transmit, to a remote client device, instructions for a user interface to be rendered at the remote client device, the user interface related to the fulfillment of the order, the user interface including an enabled user interface component that, when activated, triggers cancellation of the order;
receive a notification from the remote fulfillment computer system, the notification responsive to the request related to the fulfillment of the order;
responsive to receiving the notification, generate instructions to cause the user interface component to be disabled in subsequent renderings of the user interface at the remote client device; and
transmit, to the remote client device, the instructions to cause the user interface component to be disabled in the subsequent renderings of the user interface at the remote client device.

20. The non-transitory computer readable medium of claim 19, wherein the notification includes an indication that a particular step in a process of fulfilling the order has commenced.

* * * * *